United States Patent [19]

Harley, Jr. et al.

[11] Patent Number: 4,939,723
[45] Date of Patent: Jul. 3, 1990

[54] BIT-CHANNEL MULTIPLEXER/DEMULTIPLEXER

[75] Inventors: Thomas J. Harley, Jr., Palo Alto; Philip F. Zimmers, Los Altos, both of Calif.

[73] Assignee: Ford Aerospace Corporation, Newport Beach, Calif.

[21] Appl. No.: 362,905

[22] Filed: Jun. 7, 1989

[51] Int. Cl.$^5$ .............................................. H04J 3/22
[52] U.S. Cl. ...................................................... 370/84
[58] Field of Search .................... 370/84, 82, 83, 85.7, 370/112

[56] References Cited

U.S. PATENT DOCUMENTS

| | | |
|---|---|---|
| 3,749,842 | 7/1973 | Poretti . |
| 3,752,933 | 8/1973 | Cohen et al. . |
| 3,790,715 | 2/1974 | Inose et al. . |
| 3,982,074 | 9/1976 | Clark . |
| 3,982,077 | 9/1976 | Clark et al. . |
| 3,987,251 | 10/1976 | Texier et al. . |
| 3,988,544 | 10/1976 | Texier et al. . |
| 4,258,434 | 3/1981 | Glowinski et al. . |
| 4,429,383 | 1/1984 | Finck et al. . |
| 4,471,480 | 9/1984 | Haussmann et al. . |
| 4,547,877 | 10/1985 | Lehman et al. ........................ 370/84 |
| 4,631,720 | 12/1986 | Koeck . |
| 4,646,290 | 2/1987 | Hills . |
| 4,658,152 | 4/1987 | Walters . |
| 4,881,224 | 11/1989 | Bains ..................................... 370/84 |

Primary Examiner—Douglas W. Olms
Assistant Examiner—Melvin Marcelo
Attorney, Agent, or Firm—Edward J. Radlo; Kenneth R. Allen; Keith L. Zerschling

[57] ABSTRACT

An efficient method for time-division multiplexing multiple digital signals into a single data stream for switching and/or transmission of information to a remote location. The apparatus according to the invention receives as input, to a multiplexer, a plurality of digital data streams of arbitrary word size and data rate, any one of the data rates being changeable with time such that the total data rate of all streams combined will, in general, greatly exceed the capacity of the multiplexer. Input digital signals are assumed to have an arbitrary word size and word rate subject to the constraint that the bit rate, that is, the word rate times the word size for each signal, is an integer multiple of a predetermined integer such that any time-varying mix of digital signals, regardless of word size, can be combined into a single time-division multiplexed bit stream in such a way that no individual signal, once placed in the format, will be moved to another place in the format. A "mini-frame" structure is used to greatly simplify the control of the multiplexer and any related demultiplexer, thereby reducing the amount of data buffering required. The precise format is sufficiently flexible to vary with time such that no signal allocated a place in the format will actually be moved while it is present in the data stream.

7 Claims, 4 Drawing Sheets

BIT-CHANNEL MULTIPLEXER/DEMULTIPLEXER

BACKGROUND OF THE INVENTION

This invention relates to digital data communication, and more particularly, to a method and apparatus for multiplexing or concentrating multiple digital signals of substantially arbitrary word formats and speed into a single digital data stream using time division multiplexing techniques suitable for high speed trunk-type transmission, as between ground stations through a satellite.

Digital data communication systems have used word-by-word Time Division Multiplexing (TDM) formats having fixed-sized word slots at fixed intervals within a frame. Such systems are not able to accommodate a frequently-changing mix of signals characterized by varying sample rates and word sizes. The channel utilization factor is not maximum, and resynchronization may be necessary. Such a system is extremely difficult to control under circumstances where it is desireable to make maximum use of the available channel. It is also difficult to maintain precise relative timing information among the signals which are output from a demultiplexer.

What is needed is a technique for generating time division multiplexed information from digital data of multiple formats in a manner which maximizes channel utilization.

The following patents were uncovered in a search of the records of the United States Patent and Trademark Office in relation to the subject invention.

U.S. Pat. No. 3,982,074 to Clark describes an automatic channel assignment circuit in which there is disclosed an asynchronous multiplexer/demultiplexer system for multiplexing multiple signals having variable bit rates into a single transmitted data stream having a predetermined fixed data format consisting of subframes.

U.S. Pat. No. 3,982,077, to Clark et al., describes an asynchronous multiplexer and demultiplexer combination in which is disclosed an asynchronous multiplexer and demultiplexer system for multiplexing multiple digital signals having variable bit rates into a single transmitted data stream, having a predetermined fixed data format.

The Clark patents describe a system where the bits are spread uniformly throughout a data stream to minimize the buffering requirement. "Stuff" bits are used to take into account areas of the data stream where no real data is used. As a consequence, data channel utilization is diminished by the substitution of "stuff" bits for useful data.

In neither of the above patents is there a provision for variable data formats. Therein equal spacing is required between both transmitted and received time slots, and the data rates cannot change over time. In particular, the Clark devices would not work on a type of system requiring dynamic bit streams.

U.S. Pat. No. 4,258,434, to Glowinski et al., describes a bit-by-bit time-division digital switching network for binary data streams. Therein, bit-by-bit time division digital switching on an internal bus multiplexes a plurality of isochronous bit-serial data channels having rates which are different but submultiples of a given maximum rate. The technique associates an address word with bit of an input channel, which is an undesirable ratio of overhead to information in a communication channel.

U.S. Pat. No. 3,987,251, to Texier et al., and U.S. Pat. No. 3,988,544, to Texier et al., describe time division switching networks for switching digital data, where the rates, the number of active channels and the formats of each channel are static. It is required that the rates be multiples of one another in order to function as intended. In the multiple-format system, small format words are used to form large format words. Hence, it appears that the combination cannot be arbitrary.

U.S. Pat. No. 3,749,842, to Poretti, describes a time slot allocation network for a multiplexed telecommunication system and is cited for background information.

U.S. Pat. No. 3,752,933, to Cohen et al., describes a bit regeneration technique for time division multiplexers. It is cited as background information.

U.S. Pat. No. 3,790,715, to Inose et al., describes a digital transmission terminal for voice and low speed data. It employs time division multiplexed transmission channels which are frame based. It is cited primarily for background information.

U.S. Pat. No. 4,429,383, to Finck et al., describes a method for seizing time slots of a time-division multiplexed system having dynamic multipliers. This system also relies on fixed time slots and is relevant primarily as background information.

U.S. Pat. No. 4,471,480, to Haussmann et al., describes a programmable controller for a time-division multiplexed digital multiplexer-demultiplexer combination. A common controller is used to control synchronous input and output of data signals or asynchronous input and output of data signals, wherein the data signals are distributed throughout a fixed data format in time slots using automatic channel assignment. This patent is cited primarily for background information.

U.S. Pat. No. 4,631,720, to Koeck, describes a service integrated transmission system. This system is a frame-based system wherein the frequency of the time multiplexed frame is selected to be equal to the smallest information rate of the signals to be transmitted. This invention therefore presupposes knowledge of the expected data rates. This patent is included primarily for background information.

U.S. Pat. No. 4,646,290, to Hills, describes a data transmission method and apparatus which is intended for use with an FM subcarrier data transmission system wherein a multiple-frame matrix is constructed using an arrangement of data messages of varying bit rates in real time. This patent is included primarily for background information.

U.S. Pat. No. 4,658,152, to Walters, describes an adaptive rate multiplexer-demultiplexer. The system described is a frame-based system involving reassignment of subchannels.

What is needed is a multiplexer system for a data communication system which is capable of handling substantially arbitrary groupings of data of diverse transmission speeds, so that information from multiple sources can be combined, conveyed and then separated with a minimum of loss in transmission efficiency and at extremely high speeds.

SUMMARY OF THE INVENTION

According to the invention, an efficient method is provided for combining multiple digital signals into a single data stream of a time-division multiplexed communication system for switching and/or transmitting information. The apparatus according to the invention receives as input, to a multiplexer, a plurality of digital data streams of arbitrary word size and data rate within the constraint that the bit rate (the product of the word rate and the word size) of each signal is an integer multiple of the bit rate of the lowest rate signal, any one of the data rates being changeable with time. Where the input digital signals have an arbitrary word size and word rate subject to the stated constraint, any time-varying mix of digital signals, regardless of word size, can be combined into a single time-division multiplexed bit stream in such a way that no individual signal, once placed in the format, will be moved to another place in the format. A "mini-frame" structure is used to greatly simplify the control of the multiplexer and any related demultiplexer, thereby reducing the amount of data buffering required. The precise format is sufficiently flexible to vary with time such that no signal allocated a place in the format will actually be moved while it is present in the data stream, and a place in the format will always be available to incoming data.

Whereas prior approaches, including the subject invention, assume that the bit rate for each of the input signals is an integer submultiple of the total bit rate, the present invention removes virtually all constraints on sample size and sample rate. The relative timing of each sample of each signal can be accurately reconstructed relative to the time it becomes available at the multiplexer input.

The invention will be better understood by reference to the following detailed description in connection with the accompanying drawings.

DESCRIPTION OF THE SPECIFIC EMBODIMENTS

Figure 1:
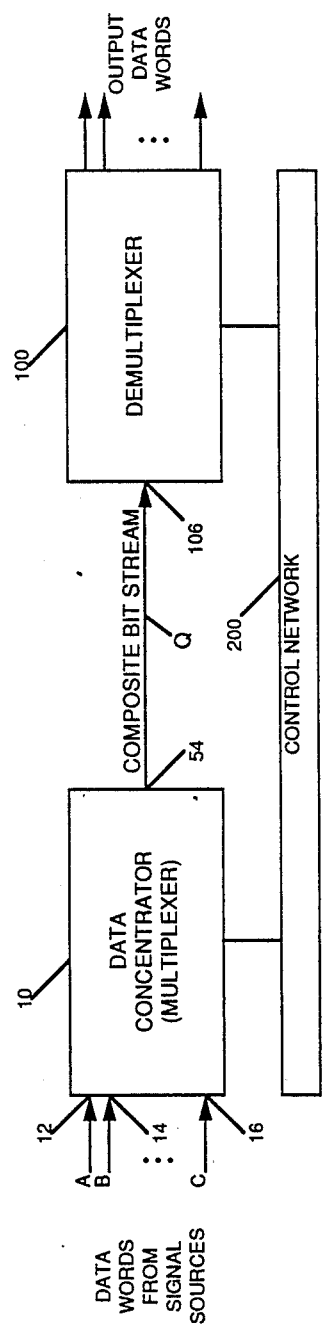
FIG. 1 is an overall block diagram of a multiplexer/demultiplexer system according to the invention.
Figure 2:
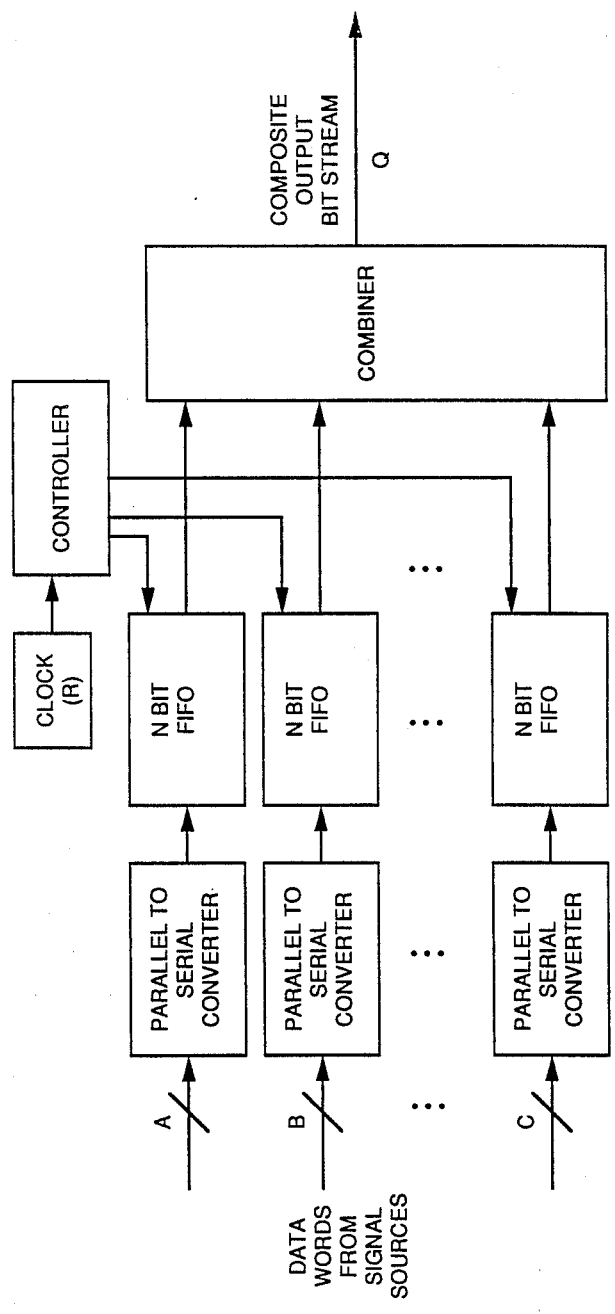
FIG. 2 is a block diagram of a data concentrating apparatus or multiplexer according to the invention.

Referring to FIG. 1, there is shown a block diagram of the overall multiplexer/demultiplexer system according to the invention consisting of a data concentrator 10, a demultiplexer 100 and a control network 200. Referring to FIGS. 1 and 2, the data concentrator 10 of the type shown in FIG. 2 is used to accept data words A, B, C in parallel from signal sources (not shown) through a plurality of signal inputs 12, 14, 16 from a plurality of parallel-to-serial converters 18, 20, 22. Three channels are shown, although the number of channels is arbitrary. The parallel-to-serial converters 18, 20, 22 convert the data words at signal inputs 12, 14, 16 into serial bit streams which are provided to serial inputs 24, 26, 28 to respective N-bit first-in, first-out (FIFO) registers 30, 32, 34. A controller 36 is provided which is driven by a clock 38 operative at a clock rate R as hereinafter explained. The controller 36 provides a control output 40, 42, 44 for each respective FIFO 30, 32, 34, and each respective FIFO 30, 32, 34 provides a serial output 46, 48, 50 to a combiner means 52 which produces a desired composite serial bit stream Q and a signal output 54.

In order to understand the invention, it is helpful to understand a derivation of the theory underlying the invention. Consider the composite bit rate R of the composite data stream Q. Within the constraints of the invention, the lowest allowable bit rate $r_{min}$ of all potential inputs to the apparatus 10 is:

$$r_{min} = R/N_0 \tag{1}$$

where $N_0$ is a predetermined integer.

Similarly, the maximum allowable bit rate $r_{max}$ of any one input is:

$$r_{max} = R/N_1 \tag{2}$$

where $N_1$ is a predetermined integer. At any time, the sum of all the bit rates r of all the inputs, including those not active (rate equal to zero), must be less than or equal to R.

The ratio of Equation (1) to Equation (2) is the length of the smallest allowable "mini-frame" in accordance with the invention. In other words, the mini-frame, which is the basic building block in the TDM format of the TDM system according to the invention, has its length given by the integer:

$$r_{max}/r_{min} = N_0/N_1 \tag{3}$$

and it has the property that the bit pattern repeats uniformly in each successive mini-frame.

In accordance with the invention, the composite bit stream Q is formulated by partitioning it into a sequence of mini-frames consisting of N bit slots, where the value of N is given by:

$$N = R/r_{min} \tag{4}$$

where R is the bit (clock) rate of the composite bit stream.

The bit rate $r_x$ of any input signal A, B, C is constrained to be:

$$r_x = r_{min} * n_x \tag{5}$$

where $1 \leq n_x \leq N$. The word rate for any input signal A, B, C is given by:

$$W_x = r_x/S_x \tag{6}$$

where $S_x$ is the word size in bits per word.

An input signal is characterized by the parameters n, S and W. When a new input signal is to be injected into the TDM format composite bit stream, it is allocated according to the invention to any n of the available and unoccupied bit slots in the mini-frame. The input signal retains the exact same position in the current mini-frame and all of the subsequent mini-frames until the signal is dropped from the input to the combiner means 52. The n allocated bit slots in the mini-frame thereby create a virtual binary channel which is exactly the bit rate required to fully accommodate the input signal.

A single mini-frame will not generally be filled with an integral number of words (or samples) of size S. As an extreme example, if the input signal bit rate is $r_{min}$, then only one bit will be contained in a mini-frame, and S mini-frames will be required for a complete word. If however n is an integer multiple of S, then there will be an integer number of words (or samples) per mini-frame.

Further according to the invention, mini-frames are formatted in a sequence in groups or "frames", where there are K mini-frames per frame. K is constrained to be the least common multiple of all the possible word sizes S. However, the length of the frame is chosen to be and to contain exactly an integer number of samples of every possible input signal present to be injected into the composite stream Q. The start of a frame is established as the start of a mini-frame. The first bit slot of the first mini-frame in a frame is selected to contain either the most significant bit (or the least significant bit) in a word to be transmitted. Succeeding bit slots within the mini-frame and corresponding subsequent mini-frames are selected to contain bits of succeeding lesser (or greater) significance. As more allocated slots become available, bits from successive words are entered in significance order. The last bit slot of the last mini-frame of a frame allocated to an input signal will hold the least significant bit (or most significant bit) of the input signal word.

Referring again to FIG. 2, the controller 36 times the output of bits from the FIFOs 30, 32, 34 so as to place them in the allocated bit slots in the frame and mini-frame. The combiner means 52, which receives the timed bits as designated by the controller 36, is typically a multiple-input OR gate. The controller 36 assures that the combiner means 52 receives only one bit at a time from each of the FIFOs 30, 32, 34.

The controller 36 receives and acts on commands received over the control network for the insertion and deletion of input signals from the composite bit stream Q. When a signal is deleted from the composite bit stream Q, the controller 36 disables and clears the FIFO corresponding to the affected input signal.

When an input signal is added, the controller 36 performs the allocation of the bit slots to signals, and controls the initialization of the corresponding FIFO. The frame and mini-frame lengths are all predetermined and fixed based on the family of input signals that must be accommodated. When a command is received to place a specific input signal into the composite stream Q, the controller 36 must allocate n available (i.e., not currently allocated to another signal) bit slots in the mini-frame to the new signal. Any reasonable slot assignment algorithm may be used, including one allocating the first n available bit slots. The bit slot pattern is stored for subsequent access as in a table-look-up memory. The controller commands the corresponding FIFO to begin passing signal data at the beginning of the last mini-frame of a frame, and begins clocking data out of the FIFO at the start of the next frame.

Figure 3:
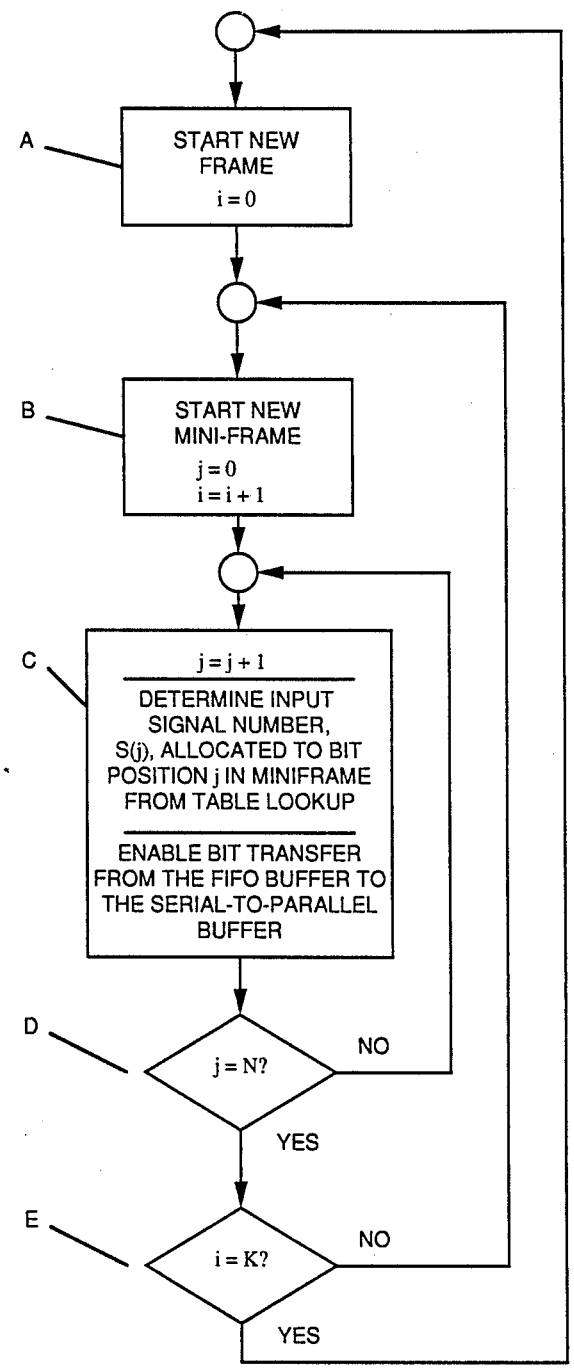
FIG. 3 is a block diagram of a demultiplexer according to the invention.

FIG. 3 shows a tutorial flow chart of the logic implemented in the controller 36 for real-time control of the signal flow. At the start of each new frame, the mini-frame counter i is reset to zero (Step A). At the start of each new mini-frame, the bit counter j is reset to zero, and the mini-frame counter i is incremented by one (Step B). At each pulse from the clock R in FIG. 2, several actions are taken (Step C): The bit counter j is incremented by one, a table look-up is used to determine which input signal S(j) has been allocated to bit slot j in the mini-frame, and the controller enables the transfer of one bit from the FIFO for signal S(j) to the combiner means 52. After this is done, the controller 36 determines whether the last bit slot of the mini-frame has been processed (i.e., j=N) (Step D). If not, then the next bit slot is processed (Step C is repeated). If so, then the controller 36 determines whether the last mini-frame in the frame has been processed (i.e., i=K) (Step E). If so, then a new frame is initiated (Repeat from Step A). In either case, a new mini-frame is begun (Step B).

Figure 4:
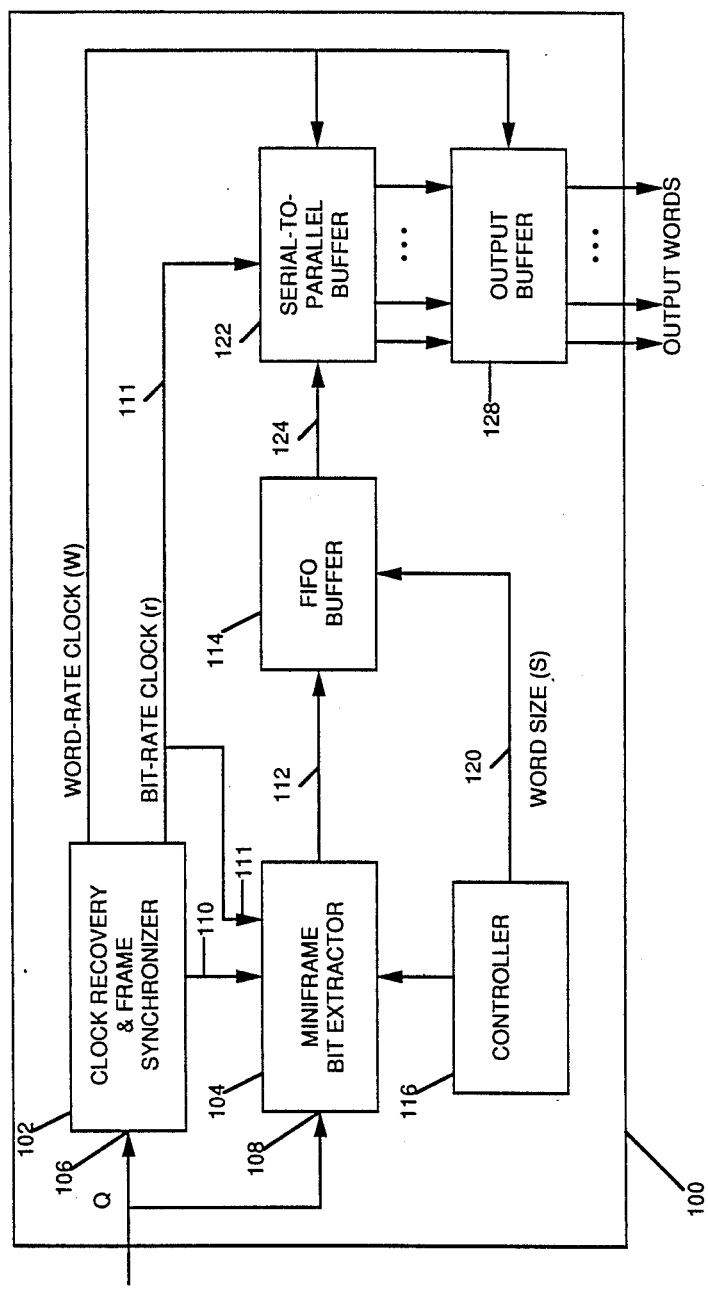
FIG. 4 is a tutorial flow chart of the controller within the multiplexer.

A demultiplexer 100 of the type shown in FIG. 4 may be used to recover and separate many streams of individual data. The recovery of data in only one signal is shown and explained herein for simplicity. A clock recovery and frame synchronizer circuit 102 and a mini-frame bit extractor circuit 104 have inputs 106 and 108 for a composite bit stream signal Q from a signal source, such as shown in FIG. 1. The clock recovery and frame synchronizer circuit 102 provides frame synchronization in a conventional manner for TDM bit streams. The mini-frame bit extractor circuit 104 is driven by a frame clock on line 110 and a bit rate clock (at rate r) on line 111. The mini-frame bit extractor circuit 104 extracts the selected signal from the identified slots in the mini-frames as the composite signal Q is received, and the resultant selected bits from the mini-frame are output via a bit path 112 to a FIFO buffer 114. A controller 116 provides the mini-frame bit slot assignments on control bus 118 to the mini-frame bit extractor circuit 104 and further provides the word sizes (the S values) to the FIFO buffer 114 on word size bus 120. A command word of no more than N bits in length is sufficient to specify which bit slots the signal bits occupy in the mini-frame under examination.

The controller 116 of the demultiplexer 100 receives and acts on commands received over the control network for the insertion and deletion of input signals from the composite bit stream Q. When a signal is deleted from the composite bit stream Q, the controller 116 disables and clears the FIFO buffer 114 for the affected output signal.

When an input signal is added, the controller 116 determines the bit slots of the mini-frame allocated to the new signal. This information may be transferred from the combiner means' controller 36 via the control network, or it may be computed by the demultiplexer controller 116 using the same allocation algorithms as the combiner means' controller. In addition, the controller 116 commands the FIFO buffer to begin receiving bits from the mini-frame bit extractor 114 at the beginning of a frame and begins clocking data out of the FIFO buffer 114 at the end of the first mini-frame of the frame.

The FIFO buffer 114 must be of sufficient length to contain the largest of one complete word of length S or one complete mini-frame of length N. (If the same buffer length is to be used regardless of specific signal parameters, the FIFO buffer 114 must be at least N bits long.) The FIFO buffer 114 output is provided to a serial-to-parallel buffer 122 through serial line 124. Both the serial-to-parallel buffer 122 and the FIFO buffer 114 are driven by the bit-rate clock on line 111 to control bit propagation at the actual bit rate r. In addition however, a word-rate clock operating at the word rate (W) is provided on a word rate clock line 126 to the serial-to-parallel buffer 122 and to an output buffer 128, through which each word is transferred at the word rate W. The rate of composite bit stream Q is the value R. Both the actual bit rate r and the word rate W are recovered by counting down from the composite bit stream rate value R in the clock recovery and frame synchronizer circuit 102. Phasing of the output samples are determined by counting from the beginning of each frame.

The invention has now been described with reference to specific embodiments. Other embodiments will be apparent to those of ordinary skill in the art. It is therefore not intended that this invention be limited, except as indicated in the appended claims.

We claim:

1. In a data communications system, a method for combining data words of a plurality of word rates and a plurality word sizes from a plurality of input digital data streams on input digital channels into a single digital bit stream, wherein the word rates and the word sizes on individual input digital channels are subject to frequent change, in order to maintain continuous communication over all of the input digital channels through an output digital channels, said method comprising the steps of:

establishing a predetermined integer wherein the product of the word rate of any expected input word and the word size for each one of all expected input digital signal formats is an integer multiple of said predetermined integer; and placing individual bits of all input digital data streams satisfying one of said input signal formats into a preselected bit slot in a mini-frame defined by said integer of a single composite data stream in a time division multiplexing (TDM) format, such that no individual bit placed in the TDM format is moved to another bit slot in the format, wherein a plurality of mini-frames comprise exactly one frame.

2. The method according to claim 1 wherein said placing step comprises inserting each of said individual bits of a single input digital bit stream in identical bit-slots in successive mini-frames.

3. The method according to claim 1 further including steps for decoding said single digital bit stream comprising:

employing a clock signal synchronous with said single composite digital bit stream;

synchronizing said clock signal to said frame;

extracting individual bits from each mini-frame of said frame into separate outputs; and concatenating individual bits of successive mini-frames into said separate outputs to form a plurality of output digital bit streams.

4. In a data communications system, an apparatus comprising:

means for combining data words of a plurality of word rates and a plurality word sizes from a plurality of input digital data streams on input digital channels into a single digital bit stream, wherein the word rates and the word sizes on individual input digital channels are subject to frequent change, in order to maintain continuous communication over all of the input digital channels through an output digital channels, said combining means comprising:

a plurality of FIFO means for receiving from said input digital channels, wherein a predetermined integer has been established specifying that the product of the word rate of any expected input word and the word size for each one of all expected input digital signal formats is an integer multiple of said predetermined integer; and means coupled to said FIFO means for placing individual bits of all input digital data streams satisfying one of said input digital signal formats into a preselected bit slot in a mini-frame defined by said integer of a single composite data stream in a time division multiplexing (TDM) format, such that no individual bit placed in the TDM format is moved to another bit slot in the format, wherein a plurality of mini-frames comprise exactly one frame.

5. The apparatus according to claim 4 wherein said placing means comprises means for inserting each of said individual bits of a single input digital bit stream in identical bit-slots in successive mini-frames.

6. The apparatus according to claim 4 further including means for decoding said single digital bit stream comprising:

means for synchronizing said clock signal to said frame;

means for extracting individual bits from each mini-frame of said frame into separate outputs; and means for concatenating individual bits of successive mini-frames into said separate outputs to form a plurality of output digital bit streams.

7. The apparatus according to claim 6 further including means for converting said output digital bit streams into bit-parallel data words.

* * * * *